United States Patent
Gaudet et al.

(10) Patent No.: US 12,298,106 B2
(45) Date of Patent: May 13, 2025

(54) LINE OF SIGHT BIAS FOR MISSILE GUIDANCE

(71) Applicant: Arizona Board of Regents on behalf of the University of Arizona, Tucson, AZ (US)

(72) Inventors: Brian Gaudet, Tucson, AZ (US); Roberto Furfaro, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 65 days.

(21) Appl. No.: 18/194,610

(22) Filed: Mar. 31, 2023

(65) Prior Publication Data
US 2023/0314104 A1    Oct. 5, 2023

Related U.S. Application Data

(60) Provisional application No. 63/325,863, filed on Mar. 31, 2022.

(51) Int. Cl.
   *F41G 7/22*    (2006.01)
(52) U.S. Cl.
   CPC .................. *F41G 7/2253* (2013.01)
(58) Field of Classification Search
   CPC .... B41G 7/2253; B41G 7/2293; G06N 3/092; G06N 3/006; G06N 3/044; F41G 7/00; F41G 7/22; F41G 7/2286; F42B 15/01
   See application file for complete search history.

(56) References Cited

U.S. PATENT DOCUMENTS

| | | | | |
|---|---|---|---|---|
| 6,244,536 B1* | 6/2001 | Cloutier | ........... | F41G 7/2286 |
| | | | | 701/4 |
| H1980 H * | 8/2001 | Cloutier | ........... | F41G 7/00 |
| | | | | 701/302 |
| 7,446,291 B1* | 11/2008 | Bock | ........... | F42B 15/01 |
| | | | | 244/3.1 |
| 8,946,606 B1* | 2/2015 | Dennison | ........... | F41G 7/2293 |
| | | | | 382/103 |
| 2004/0155142 A1* | 8/2004 | Muravez | ........... | F41G 7/2286 |
| | | | | 244/3.1 |
| 2013/0153707 A1* | 6/2013 | Gate | ........... | F41G 7/22 |
| | | | | 244/3.15 |

OTHER PUBLICATIONS

S. A. Murtaugh and H. E. Criel, "Fundamentals of proportional navigation," in IEEE Spectrum, vol. 3, No. 12, pp. 75-85, Dec. 1966, doi: 10.1109/MSPEC.1966.5217080. (Year: 1966).*

(Continued)

*Primary Examiner* — Bernarr E Gregory
(74) *Attorney, Agent, or Firm* — BLANK ROME LLP

(57) ABSTRACT

A missile guidance method that applies a curvature parameterization to a line-of-sight unit vector between a missile and a target. A line-of-sight rotation rate is derived from the line-of-sight unit vector with the applied curvature parameterization. In some embodiments, the curvature parameterization is learned by a deep learning network (e.g., a deep neural network that includes a recurrent layer). The deep neural network may be optimized using meta reinforcement learning over an ensemble of engagement scenarios with varying target behavior.

18 Claims, 3 Drawing Sheets

(56) References Cited

OTHER PUBLICATIONS

C. Liang, W. Wang, Z. Liu, C. Lai and S. Wang, "Range-Aware Impact Angle Guidance Law With Deep Reinforcement Meta-Learning," in IEEE Access, vol. 8, p. 152093-152104, 2020, doi: 10.1109/ACCESS.2020.3017480. (Year: 2020).*

Gaudet, Brian, and Roberto Furfaro. "Integrated and Adaptive Guidance and Control for Endoatmospheric Missiles via Reinforcement Learning." arXiv e-prints (2021): arXiv-2109. Published Sep. 8, 2021. (Year: 2021).*

Kebo Li, et al., "Performance analysis of three-dimensional differential geometric guidance law against low-speed maneuvering targets", Astrodynamics, vol. 2, No. 3, pp. 233-247, 2018.

K. Ravindra Babu, et al., "Switched Bias Proportional Navigation for Homing Guidance Against Highly Maneuvering Targets", Journal of Guidance, Control, and Dynamics, vol. 17, No. 6, pp. 1357-1363, 1994.

Satadal Ghosh, et al., "Capturability of Augmented Pure Proportional Navigation Guidance Against Time-Varying Target Maneuvers", Journal of Guidance, Control, and Dynamics, vol. 37, No. 5, , pp. 1446-1461, 2014.

Ying-Chwan Chiou, et al., "Geometric Approach to Three-Dimensional Missile Guidance Problem", Journal of Guidance, Control, and Dynamics, vol. 21, No. 2, 1998, pp. 335-341.

JX Wang, et al., "Learning to Reinforcement Learn", arXiv:1611.05763v3 [cs.LG], Jan. 23, 2017.

S.E. Talole, et al., "Proportional Navigation Through Predictive Control", Journal of Guidance, Control and Dynamics, vol. 21, No. 6, 1998, pp. 1004-1006.

* cited by examiner

LINE OF SIGHT BIAS FOR MISSILE GUIDANCE

CROSS-REFERENCE TO RELATED APPLICATIONS

This application claims priority to U.S. Prov. Pat. Appl. No. 63/325,863, filed Mar. 31, 2022, which is hereby incorporated by reference.

FEDERAL FUNDING

None

BACKGROUND

Existing missile guidance methods—such as proportional navigation (PN), augmented proportional navigation (APN), ad-hoc filters, and single loop integrated guidance and control systems—are not optimal to intercept maneuvering targets.

Using proportional navigation, a commanded acceleration is perpendicular to the instantaneous pursuer-target line of sight (LOS) and is proportional to the line-of-sight angular rate and closing velocity. Using augmented proportional navigation, the commanded acceleration from proportional navigation is augmented with an additional term that is a function of the estimated target acceleration. Although augmented proportional navigation works well with targets maneuvering with a constant acceleration, its performance can actually be worse than standard proportional guidance for weaving targets and other more complex target maneuvers. Moreover, augmented proportional navigation requires an estimation of target acceleration, which is still an open problem for passive seekers that cannot measure range and range rate. To intercept weaving targets, ad-hoc filters and other solutions have been proposed that attempt to estimate the weave frequency and amplitude. However, those solutions rely on the target maintaining a constant weave frequency and amplitude. Finally, while single loop integrated guidance and control systems have the potential to significantly improve missile performance by reducing flight control response time, those systems map navigation system outputs directly to commanded fin deflections. Because there is no commanded acceleration to augment, those single loop integrated guidance and control systems are incompatible with augmented proportional navigation.

Accordingly, there is a need for improved missile guidance to intercept maneuvering targets.

SUMMARY

In order to overcome those and other drawbacks of the prior art, a missile guidance system and method are disclosed. A curvature parameterization is applied to a line-of-sight unit vector between a missile and a target and a line-of-sight rotation rate is derived from the line-of-sight unit vector with the applied curvature parameterization. In some embodiments, the curvature parameterization is learned by a deep learning network (e.g., a deep neural network that includes a recurrent layer). The deep neural network may be optimized using meta reinforcement learning over an ensemble of engagement scenarios with varying target behavior.

In some embodiments, for example, the deep learning network generates a policy for generating a rotational velocity vector and a line-of-sight bias network integrates the rotational velocity vector to create an attitude parameterization, uses the attitude parameterization to create a rotation matrix, and uses the rotation matrix to apply the curvature parameterization to the line-of-sight unit vector. In other embodiments, the deep learning network may learn a policy for generating a curvature parameterization to apply to a relative velocity unit vector.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments.

DETAILED DESCRIPTION

Figure 1A:
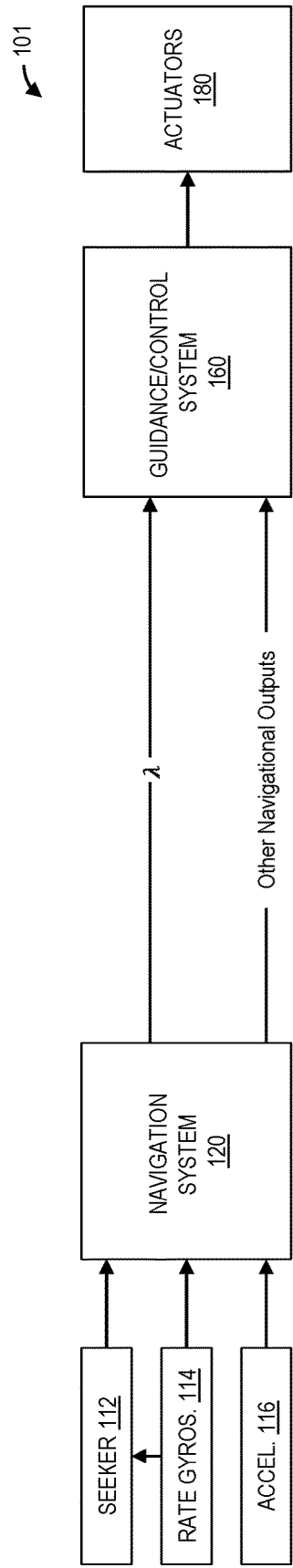
FIG. 1A is a diagram illustrating a prior art navigation system of an air-to-air missile.

Reference to the drawings illustrating various views of exemplary embodiments is now made. In the drawings and the description of the drawings herein, certain terminology is used for convenience only and is not to be taken as limiting the embodiments of the present invention. Furthermore, in the drawings and the description below, like numerals indicate like elements throughout.

Figure 1B:
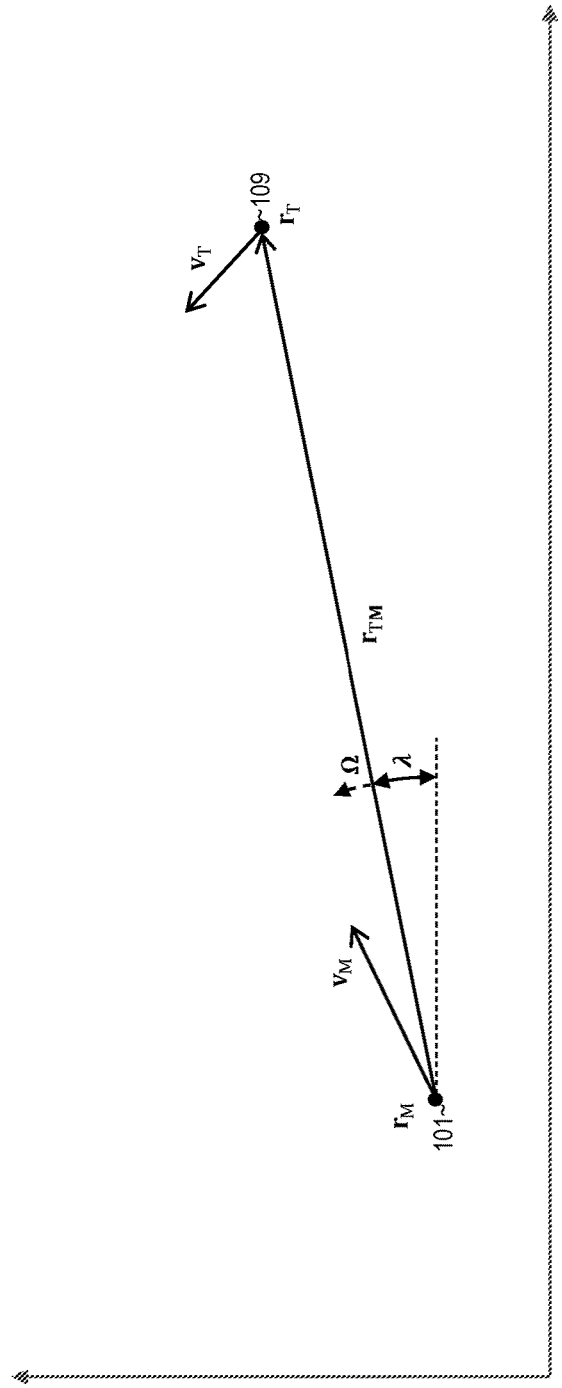
FIG. 1B is a planar representation of an engagement between the missile and a target.

FIG. 1A is a diagram illustrating a prior art navigation system 120 of an air-to-air missile 101. FIG. 1B is a planar representation of an engagement between the missile 101 and a target 109. As shown in FIG. 1B, the missile 101 is represented by a missile position vector $r_M$ indicative of position of the missile 101 relative to an origin of a coordinate system and a missile velocity vector $v_M$ indicative of the amplitude and direction of the instantaneous velocity of the missile 101. Similarly, the target 109 by a target position vector $r_T$ and a target velocity vector $v_T$. The relative position vector is defined as $r_{TM}=r_T-r_M$ and the relative velocity vector is defined as $v_{TM}=v_T-v_M$.

In the planar representation of FIG. 1B, the relative position vector $r_{TM}$ forms a line-of-sight angle $\lambda$ relative to an axis of the coordinate plane. The rate of change of the line-of-sight angle $\lambda$ as the missile 101 travels along the target velocity vector $v_T$ and the target 109 travels along the target velocity vector $v_T$ is referred to as the line-of-sight rotation rate $\Omega$. The planar representation of FIG. 1B can easily be extended to a three-dimensional representation.

As shown in FIG. 1A, the missile 101 includes a seeker 112 (e.g., an infrared seeker) protected by a radome, rate gyroscopes 114, and an accelerometer 116. The navigation system 120 identifies the line-of-sight unit vector A based on sensor data from a seeker 112 and outputs the line-of-sight unit vector A to a guidance/control system that outputs control signals to actuators to intercept the target 109. (The navigation system 120 also monitors the position, orientation, and translational and rotational velocity and acceleration of the missile 101 based on sensor data from rate gyroscopes 114 and an accelerometer 116.)

Figure 2A:
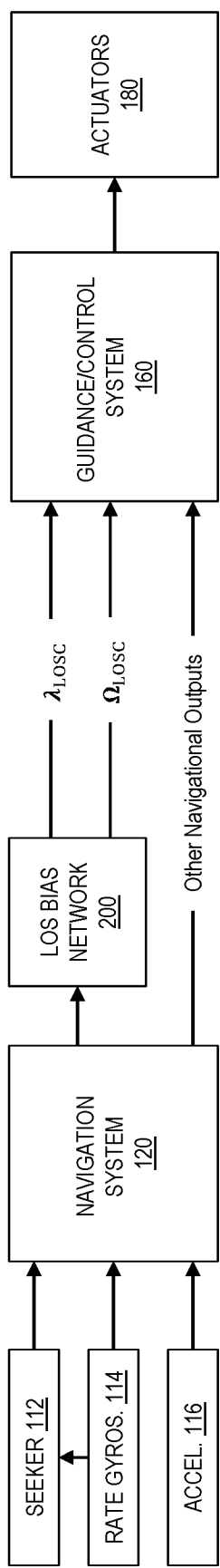
FIG. 2A is a diagram illustrating a line-of-sight bias network according to exemplary embodiments.
Figure 2B:
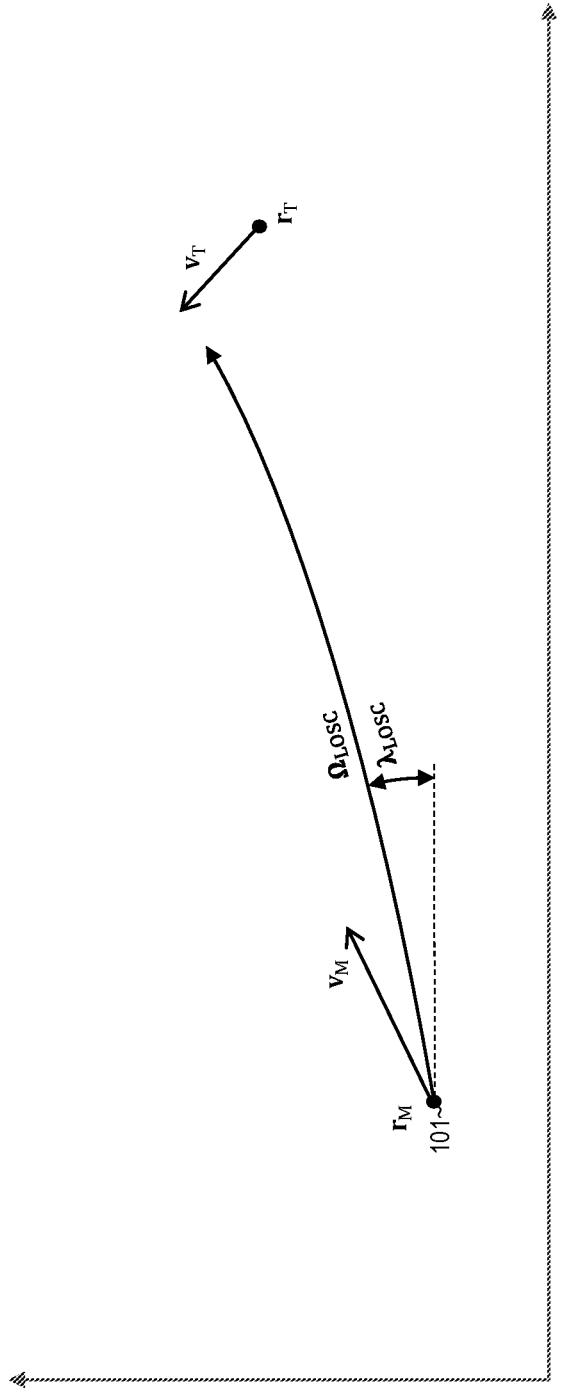
FIG. 2B is a simplified representation of an example engagement by a missile utilizing the line-of-sight bias network.

FIG. 2A is a diagram illustrating a line-of-sight bias network 200 according to exemplary embodiments. FIG. 2B is a simplified representation of an engagement by a missile 101 having the line-of-sight bias network 200 according to exemplary embodiments.

As described in detail below, the line-of-sight bias network 200 uses a line-of-sight curvature policy $\tau$ to apply a curvature parameterization to the line-of-sight unit vector $\lambda$ provided by the navigation system 120. The curvature parameterization biases the line-of-sight rotation rate $\Omega$ that is derived from the line-of-sight unit vector $\lambda$. The line-of-sight bias network 200 outputs the curved line-of-sight unit vector $\lambda_{LOSC}$ to the guidance/control system 160. The biased line-of-sight rotation rate $\Omega_{LOSC}$ may be output to the guidance/control system 160 by the line-of-sight bias network 200 or derived from the curved line-of-sight unit vector $\lambda_{LOSC}$ by the guidance/control system 160. The line-of-sight bias network 200 may be realized, for example, as software running on a central processing unit (CPU) or tensor processing unit (TPU), neuromorphic implementations, etc.

The line-of-sight curvature policy $\pi$: o→u maps observations o to actions u. The observations o, for example, may be given in Equation 1:

$$o = [\tilde{\lambda} \tilde{\Omega} v_c r] \quad [\text{Eq. 1}]$$

where $\tilde{\lambda}$ is the three-dimensional line-of-sight unit vector, $\tilde{\Omega}$ is the line-of-sight rotation rate, $v_c$ is the closing velocity $v_c = -\tilde{\lambda} \cdot v_{TM}$, and r is the relative range $r = \|r_{TM}\|$.

The action u is used to compute a shaped line-of-sight direction vector $\lambda_{LOSC}$, which is used to construct a rotation vector $Q_{LOSC}$ as shown in equation 2:

$$\Omega_{LOSC} = \frac{r_{TM_{LOSC}} \times v_{TM}}{r_{TM_{LOSC}} \cdot r_{TM_{LOSC}}} \quad [\text{Eq. 2}]$$

where $r_{TM_{LOSC}} = \lambda_{LOSC} r$.

By varying the action u during the engagement, the line-of-sight curvature policy $\pi$ can curve the line-of-sight direction vector $\lambda_{LOSC}$, which is used to construct the line-of-sight rotation vector $\Omega_{LOSC}$. Both the curved line-of-sight direction vector $\lambda_{LOSC}$ and the rotation vector $\Omega_{LOSC}$ are used by the guidance/control system 160 to intercept the target 109. For example, the action u may be scaled and interpreted as a Euler 321 attitude $\theta_{LOSC} \in SO(3) = ku$ where k is a scaling factor (e.g., 2°). The Euler 321 attitude $\theta_{LOSC}$ may then be used to construct a direction cosine matrix $C(\theta_{LOSC})$, which is used to compute the shaped line-of-sight direction vector as $\lambda_{LOSC} = C(\theta_{LOSC})\tilde{\lambda}$, which is used to construct the line-of-sight rotation vector $\Omega_{LOSC}$.

A deep learning network, for example a reinforcement learning framework, may be used to simulate interactions between a missile 101 and a target 109 to learn the curvature parameterization to apply to the line-of-sight unit vector $\lambda$ provided by the navigation system 120 and bias the line-of-sight rotation rate $\Omega$. In other embodiments, the system may use other optimization algorithms to generate the line-of-sight bias.

Figure 3:
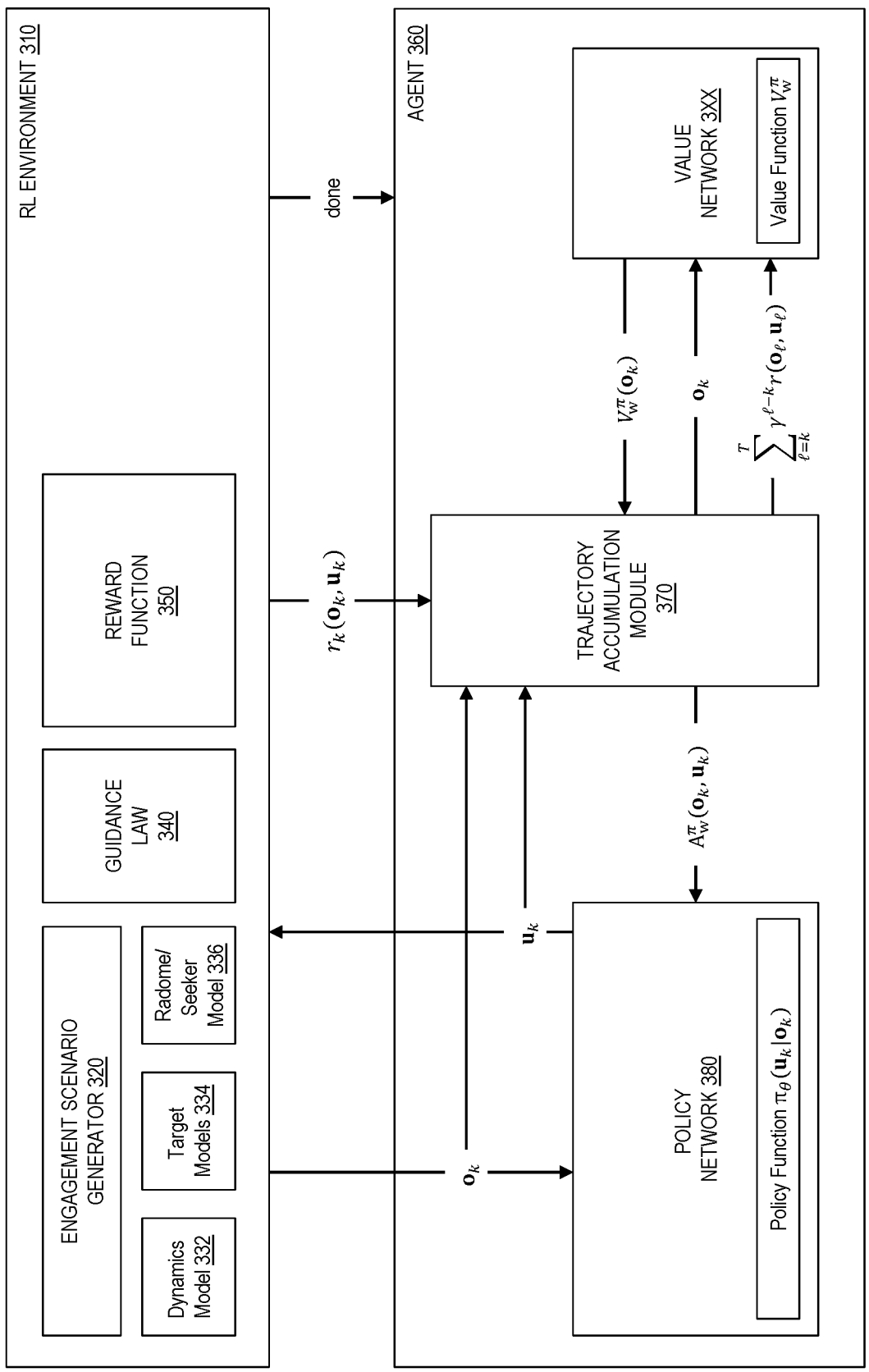
FIG. 3 is a diagram of a reinforcement learning framework according to exemplary embodiments.

FIG. 3 is a diagram of a reinforcement learning framework 300 according to exemplary embodiments.

In the reinforcement learning framework 300, an agent 360 learns through episodic interaction with a reinforcement learning environment 310 how to successfully complete a task using a policy function $\pi$ that maps observations o to actions u. Reinforcement learning has been demonstrated to be effective in optimizing integrated and adaptive guidance and control systems 160 that generate direct closed-loop mapping from navigation system 120 outputs to actuator 180 commands (e.g., asteroid close proximity operations, planetary landing, exoatmospheric intercept, endoatmospheric intercept, and hypersonic vehicle guidance).

The reinforcement learning environment 310 of FIG. 3 is an abstraction of the environment in which a missile 101 intercepts a target 109. The reinforcement learning framework 300 utilizes meta-reinforcement learning, which differs from generic reinforcement learning in that the agent 360 learns over an ensemble of environments 310. Accordingly, the reinforcement learning environment 310 of FIG. 3 includes an engagement scenario generator 320, a dynamics model 332, an ensemble of target behavior models 334, a radome model 336, a guidance law 340, and a reward function 350. The dynamics model 332 is a model of the properties of moving air and the interaction between the air and the missile 101 and target 109 moving through that air. Each target behavior model 334 randomly selects and simulates maneuvers (e.g., weave, bang-bang, jinking maneuvers) that may be performed by the target 109 to avoid interception. The radome and seeker model 336 is a model of the noise that is typically present in the observations o, for example due to refraction of the look angle through the radome, Gaussian white noise, gimbal lag of the seeker 112, etc. The guidance law 340 may be any system used to control the movement of the missile 101 (e.g., proportional navigation, augmented proportional navigation, etc.). Using the engagement scenario generator 320 and the models 332, 334, and 336, the environment 310 of FIG. 3 varies the engagement scenarios, dynamics, aerodynamic coefficients, radome parameters, and other factors. Optimization within the meta-reinforcement learning framework 300 results in an agent 360 that can quickly adapt to novel environments 310, often with just a few steps of interaction with the environment.

The engagement scenario generator 320 initializes an episode by randomly generating a ground truth state x. The state $x_k$ at each time index k may include, for example, the missile position vector $r_M$, the missile velocity vector $v_M$, the target position vector $r_T$, the target velocity vector $v_T$, etc. The environment 310 maps each state $x_k$ to an observation $o_k$ indicative of the sensor data that may be output by the seeker 112 (e.g., closing velocity $v_c$ and relative range $\|r_{TM}\|$) at the state $x_k$ and passes each observation $o_k$ to the agent 360.

The agent 360 uses each observation $o_k$ to generate an action $u_k$ that is sent to the environment 310. The environment 310 then uses each action $u_k$ and the current ground truth state $x_k$ to generate the next state $x_{k+1}$. The environment also uses the reward function 350 described below to generate a scalar reward signal $r(x_k, u_k)$ based on the state $x_k$ and the action $u_k$ generated by the agent 360. The reward $r(x_k, u_k)$ and the observation $o_{k+1}$ corresponding to the next state $x_{k+1}$ are then passed to the agent 360. The process repeats until the environment 310 terminates the episode, with the termination signaled to the agent 360 via a done signal.

By receiving rewards r in response to actions u, the agent 360 learns from the consequences of the selected action u rather than from being explicitly taught. The agent 360 selects actions u on basis of its past experiences (exploitation) and also by new choices (exploration), which is essentially trial and error learning. The rewards $r(x_k, u_k)$ encode the success of each action $u_k$ and the agent 360 seeks to learn a policy function $\pi_\theta(u_k|o_k)$ that selects actions u that maximize the accumulated reward r over time. To minimize the convergence time to learn the optimal policy function $\pi_\theta(u_k|o_k)$, the agent 360 may also learn the value function $V_w^\pi(o_k)$ describing, for every observation o, how much future reward r can be expected when performing actions u.

In the embodiment of FIG. 3, a trajectory accumulation module 370 collects observations o, actions u, and rewards r over a set of episodes (referred to as rollouts) simulating interaction between the agent 360 and environment 310. The collected observations o, actions u, and rewards r are used to update the policy function $\pi_\theta(u_k|o_k)$ and value function $V_w^\pi(o_k)$. In the air-to-air missile environment 310, for example, an episode terminates when the closing velocity $$v_c = -\frac{r_{TM} \cdot v_{TM}}{r_{TM}}$$

turns negative. Each rollout may consist of 60 episodes. The reinforcement learning framework 300 may be optimized for 90,000 episodes.

The reward function 350 maps observations o and actions u to a scalar reward signal r. For example, the reward function 350 may include two terminal rewards $r_{term1}$ and $r_{term2}$ and a curvature penalty $r_{curve}$, for example as shown in equation 3:

$$r = r_{term1} + r_{term2} - r_{curve} \quad [\text{Eq. 3}]$$

The first terminal reward $r_{term1}$ is in response to a determination that the relative distance $r_{TM}$ between the missile 101 and the target 109 is less than a threshold distance $r_{lim}$, for example as shown in equation 4:

$$r_{term1} = \begin{cases} \beta, & \text{if } r_{TM} < r_{lim} \text{ and done} \\ 0, & \text{otherwise} \end{cases} \quad [\text{Eq. 4}]$$

where "done" indicates the last step of an episode.

However, even when the relative distance $r_{TM}$ at the last step of an episode is greater the threshold distance $r_{lim}$, a second terminal reward $r_{term2}$ that is inversely proportional to the relative distance $\|r_{TM}\|$ is provided, for example as shown in equation 5:

$$r_{term2} = \begin{cases} \in \exp\left(\frac{\|r_{TM}\|^2}{\sigma_{LOSC}^2}\right) \\ 0, \text{ otherwise} \end{cases} \quad [\text{Eq. 5}]$$

The curvature penalty $r_{curve}$ penalizes line-of-sight curvature, encouraging the agent 360 to curve the line-of-sight $\lambda$ only when it results in higher terminal rewards $r_{term1}$ and $r_{term2}$, for example as shown in equation 6:

$$r_{curve} = \alpha\|\theta_{LOSC}\| \quad [\text{Eq. 6}]$$

The hyperparameters may be $\alpha=0.01$, $\beta=10$, $r_{lim}=1m$, $\in=20$, and $\sigma_{LOSC}=1$.

The value function $V_w^\pi(o_k)$ may be learned by minimizing the difference the predicted value $V_w^\pi(o_k^i)$ and the actual sum of discounted rewards, for example as shown in the cost function L(w) of equation 7:

$$L(w) = \frac{1}{2M}\sum_{i=1}^{M}\left(V_w^\pi(o_k) - \left[\sum_{\ell=k}^{T}\gamma^{\ell-k}r(u_\ell^i, o_\ell^i)\right]\right)^2 \quad [\text{Eq. 7}]$$

The discount rate $\gamma$ of 0.95 may be used for the curvature penalty $r_{curve}$ and the smaller terminal reward $r_{term2}$. A discount rate $\gamma$ of 0.995 may be used for may be used for the larger terminal reward $r_{term1}$.

Deep reinforcement learning involves building a deep learning model which enables function approximation between the input features and future discounted rewards values. That map of input features and all possible future discounted rewards values at a given state enables the reinforcement learning agent 360 to get an overall picture of environment 310, which further helps the agent 360 in choosing the optimal path. To get to the optimal path, the agent 360 can use an advantage function $A_w^\pi(o_k, u_k)$, which is the difference of the possible future discounted rewards values and the average of actions u which the agent 360 would have taken given that observation $o_k$. An example implementation of reinforcement learning framework 300 uses an approximation to the advantage function that is the difference between the empirical return and a state value function baseline, for example as shown in equation 8:

$$A_w^\pi(o_k, u_k) = \left[\sum_{\ell=k}^{T}\gamma^{\ell-k}r(o_\ell, u_\ell)\right] - V_w^\pi(x_k) \quad [\text{Eq. 8}]$$

The reinforcement learning framework 300 may utilize any policy gradient method for reinforcement learning. For example, the reinforcement learning may be implemented using proximal policy optimization (PPO), which alternates between sampling data through interaction with the environment 310 and optimizing a "surrogate" objective function using stochastic gradient ascent. Proximal policy optimization has demonstrated state-of-the-art performance for many reinforcement learning benchmark problems.

Proximal policy optimization (PPO) approximates the Trust Region Policy Optimization method by accounting for the policy adjustment constraint with a clipped objective function. The objective function used with proximal policy optimization can be expressed in terms of the probability ratio $p_k(\theta)$, for example given by equation 9:

$$p_m(\theta) = \frac{\pi_\theta(u_k|o_k)}{\pi_{\theta_{old}}(u_k|o_k)} \quad [\text{Eq. 9}]$$

The optimization objective function may be formulated to minimize miss distance while meeting path constraints (such as load, heating rate, and look angle), for example as described below. Two surrogate objectives may be created, the first surrogate objective being the probability ratio $p_k(\theta)$ multiplied by the advantages $A_w^\pi(o_k, u_k)$, for example as shown in equation 10:

$$obj1 = p_m(\theta)A_w^\pi(o_k, u_k) \quad [\text{Eq. 10}]$$

The second surrogate objective is a clipped (using clipping parameter E) version of the probability ratio $p_k(0)$ multiplied by the advantages $A_w^\pi(o_k, u_k)$, for example as shown in equation 11:

$$obj2 = \text{clip}(p_m(\theta)A_w^\pi(o_k, u_k), 1-\in, 1+\in) \quad [\text{Eq. 11}]$$

The objective to be maximized $J(\theta)$ is then the expectation under the trajectories induced by the policy of the lesser of those two surrogate objectives, for example as shown in equation 12:

$$J(\theta) = \mathbb{E}_{p_{(\tau)}}[\min(obj1, obj2)] \quad [\text{Eq. 12}]$$

Both the policy function $\pi_\theta(u_k|o_k)$ and the value function $V_w^\pi(o_k)$ may be implemented using neural networks, for example four-layer neural networks with tan h activations on each hidden layer. In the embodiment of FIG. 3, the policy function $\pi_\theta(u_k|o_k)$ is implemented using a policy network 380 and the value function $V_w^\pi(o_k)$ is implemented using a value network. The policy network 380 and the value network 390 may periodically update the policy function $\pi_\theta(u_k|o_k)$ and the value function $V_w^\pi(o_k)$ during optimization, for example after accumulating trajectory rollouts of 60 simulated episodes.

An example network architecture is shown in the following table, where nhi is the number of units in layer i, obs_dim is the observation dimension, and act dim is the action dimension.

| | Policy Network 380 | | Value Network 390 | |
|---|---|---|---|---|
| Layer | # units | Activation | # units | Activation |
| hidden 1 | 10*obs_dim | tanh | 10*obs_dim | tanh |
| hidden 2 | $\sqrt{n_{h1} * n_{h3}}$ | tanh | $\sqrt{n_{h1} * n_{h3}}$ | tanh |
| hidden 3 | 5 | tanh | 5 | tanh |
| output | 1 | linear | 1 | linear |

Both the policy network 380 and the value network 390 may contain one or more recurrent network layers. For example, hidden layer 2 above of both the policy network 380 and the value network 390 may be a recurrent layer implemented using gated recurrent units. For a given trajectory over observations o and actions u, the recurrent layer will evolve differently for different target maneuvers, allowing the policy network 380 to infer the nature of the maneuver. Because both the policy function $\pi_\theta(u_k|o_k)$ and the value function $V_w^\pi(o_k)$ used to optimize the policy function $\pi_\theta(u_k|o_k)$ contain a recurrent network layer, the policy function $\pi_\theta(u_k|o_k)$ generates actions using the history of observations u, allowing the policy function $\pi_\theta(u_k|o_k)$ to infer properties of the target maneuvers. Meanwhile, by optimizing over an ensemble of target behavior models 334, the agent 360 learns to adapt, using the recurrent layer's hidden state to infer the current target behavior model 334.

Once the policy network 380 of the reinforcement learning framework 300 converges on a policy function $\pi_\theta(u_k|o_k)$, the optimized policy function $\pi_\theta(u_k|o_k)$ may be used by the line-of-sight bias network 200 to apply a curvature parameterization to the line of sight unit vector λ. Additionally, to further enhance performance, the reinforcement learning framework 300 may also learn a curvature parameterization to apply to the relative velocity unit vector $v_{TM}$.

When combined with proportional navigation, the line-of-sight bias network 200 significantly outperforms augmented proportional navigation with perfect knowledge of target acceleration, achieving improved accuracy with less control effort against a wide range of target maneuvers. For example, the disclosed method significantly outperforms augmented proportional navigation for the case of random weave and bang-bang target maneuvers. Additionally, the disclosed method can generalize to novel maneuvers. Furthermore, the path constraint specification of the disclosed method is a significant improvement compared to augmented proportional navigation. Finally, the disclosed method is compatible with both passive sensors (e.g., infrared seekers) and single loop integrated guidance and control.

While preferred embodiments have been described above, those skilled in the art who have reviewed the present disclosure will readily appreciate that other embodiments can be realized within the scope of the invention. Accordingly, the present invention should be construed as limited only by any appended claims.

What is claimed is:

1. A missile guidance method, comprising:
receiving, from a navigation system, a line-of-sight unit vector indicative of a direction from a missile position of a missile to a target position of a target;
calculating a curved line-of-sight direction vector by applying a curvature parameterization to the line-of-sight unit vector; and
deriving a line-of-sight rotation rate for guiding the missile to the target from the curved line-of-sight direction vector.

2. The missile guidance method of claim 1, wherein a policy for generating the curvature parameterization is learned by a deep learning network.

3. The missile guidance method of claim 2, wherein the deep neural network includes a recurrent layer.

4. The missile guidance method of claim 2, wherein the deep neural network is optimized using meta reinforcement learning over an ensemble of engagement scenarios with varying target behavior.

5. The missile guidance method of claim 2, wherein:
the curvature parameterization is generated by:
using the policy generated by the deep learning network to generate a rotational velocity vector;
integrating the rotational velocity vector to create an attitude parameterization; and
using the attitude parameterization to create a rotation matrix; and
applying the curvature parameterization comprises using the rotation matrix to apply the curvature parameterization to the line-of-sight unit vector.

6. The missile guidance method of claim 1, further comprising:
receiving a relative velocity unit vector; and
using a policy learned by a deep learning network to generate a curvature parameterization to apply to the relative velocity unit vector.

7. A missile guidance system for use with a navigation system, the missile guidance system comprising:
a receiver adapted to receive a line-of-sight unit vector indicative of a direction from a missile position of a missile to a target position of a target from the navigation system;
a line-of-sight bias network adapted to:
calculate a curved line-of-sight direction vector by applying a curvature parameterization to the line-of-sight unit vector; and
derive a line-of-sight rotation rate for guiding the missile to the target from the curved line-of-sight direction vector.

8. The system of claim 7, further comprising:
a deep learning network that learns a policy for generating the curvature parameterization.

9. The system of claim 8, wherein the deep neural network includes a recurrent layer.

10. The system of claim 8, wherein the deep neural network is optimized using meta reinforcement learning over an ensemble of engagement scenarios with varying target behavior.

11. The system of claim 8, wherein:
the deep learning network generates a policy for generating a rotational velocity vector; and
the line-of-sight bias network:

integrates the rotational velocity vector to create an attitude parameterization;

uses the attitude parameterization to create a rotation matrix; and uses the rotation matrix to apply the curvature parameterization to the line-of-sight unit vector.

12. The system of claim 8, wherein:

the line-of-sight bias network receives a relative velocity unit vector; and the deep learning network learns a policy for generating a curvature parameterization to apply to the relative velocity unit vector.

13. Non-transitory computer readable storage media (CRSM) storing instructions that, when executed by a hardware computer processing unit of a computing device, cause the computing device to:

calculate a curved line-of-sight direction vector by applying a curvature parameterization to a line-of-sight unit vector received from a navigation system; and derive a line-of-sight rotation rate from the curved line-of-sight direction vector.

14. The CRSM of claim 13, wherein a policy for generating the curvature parameterization is learned by a deep learning network.

15. The CRSM of claim 14, wherein the deep learning network includes a recurrent layer.

16. The CRSM of claim 14, wherein the deep neural network is optimized using meta reinforcement learning over an ensemble of engagement scenarios with varying target behavior.

17. The CRSM of claim 14, wherein:

the curvature parameterization is generated by:

using the policy generated by the deep learning network to generate a rotational velocity vector;

integrating the rotational velocity vector to create an attitude parameterization; and using the attitude parameterization to create a rotation matrix; and applying the curvature parameterization comprises using the rotation matrix to apply the curvature parameterization to the line-of-sight unit vector.

18. The CRSM of claim 13, wherein the instructions further cause the computing device to:

receive a relative velocity unit vector; and use a policy generated by the deep learning network to generate a curvature parameterization to apply to the relative velocity unit vector.

* * * * *